United States Patent
Kanniganti

(10) Patent No.: US 11,204,299 B2
(45) Date of Patent: Dec. 21, 2021

(54) METHOD AND SYSTEM FOR PREDICTING WATER LEAKAGE EVENTS IN DISTRICT-METERED-AREA OF WATER DISTRIBUTION NETWORK

(71) Applicant: Wipro Limited, Bangalore (IN)

(72) Inventor: Nagaraj Kanniganti, Hyderabad (IN)

(73) Assignee: Wipro Limited, Bangalore (IN)

( * ) Notice: Subject to any disclaimer, the term of this patent is extended or adjusted under 35 U.S.C. 154(b) by 86 days.

(21) Appl. No.: 16/700,177

(22) Filed: Dec. 2, 2019

(65) Prior Publication Data

US 2021/0096037 A1 Apr. 1, 2021

(30) Foreign Application Priority Data

Sep. 26, 2019 (IN) .............................. 201941038921

(51) Int. Cl.
| | | |
|---|---|---|
| *G01M 3/26* | (2006.01) | |
| *G01M 3/00* | (2006.01) | |
| *G01M 3/28* | (2006.01) | |
| *G06F 17/18* | (2006.01) | |

(52) U.S. Cl.
CPC ................ *G01M 3/26* (2013.01); *G01M 3/00* (2013.01); *G01M 3/28* (2013.01); *G06F 17/18* (2013.01)

(58) Field of Classification Search
USPC .......................................................... 702/51
See application file for complete search history.

(56) References Cited

U.S. PATENT DOCUMENTS

| | | | |
|---|---|---|---|
| 9,053,519 B2 | 6/2015 | Scolnicov et al. | |
| 10,242,414 B2 | 3/2019 | Scolnicov et al. | |
| 10,526,771 B1* | 1/2020 | Devereaux | ............... E03B 7/071 |
| 10,663,933 B2* | 5/2020 | Rasekh | .................. E21B 49/088 |
| 2011/0215945 A1* | 9/2011 | Peleg | ..................... G06Q 50/06 |
| | | | 340/870.02 |

(Continued)

FOREIGN PATENT DOCUMENTS

WO 2017001522 A1 1/2017

OTHER PUBLICATIONS

Dias, P., "Using IoT to Detect Water Leakages with Powel", Microsoft: Technical Case Studies, Nov. 29, 2016. pp. 1-15.

*Primary Examiner* — Paul D Lee
(74) *Attorney, Agent, or Firm* — Finnegan, Henderson, Farabow, Garrett & Dunner, LLP

(57) ABSTRACT

Disclosed herein is a method and system for predicting water leakage events in district metered area of water distribution network. The method comprises receiving historic data of water flow and water pressure associated with DMA for predicting flow data and pressure data of water in the DMA for predefined future time period. Thereafter, method comprises retrieving plurality of cluster points corresponding to the predicted flow data, the pressure data, and an anomaly score identified for each of the plurality of cluster points from machine learning model. The method detects one or more cluster points as anomaly points by comparing anomaly scores with lower bound value and upper bound value and thereafter predicts leakage events corresponding to each of the detected anomaly points. In this manner, present disclosure predicts water leakage events in DMA for future time intervals and hence necessary leakage maintenance actions may be taken to avoid such events.

9 Claims, 6 Drawing Sheets

(56) References Cited

U.S. PATENT DOCUMENTS

| | | | | |
|---|---|---|---|---|
| 2012/0185184 | A1* | 7/2012 | Armon | G01D 4/002 702/51 |
| 2013/0332090 | A1* | 12/2013 | Scolnicov | G06Q 50/06 702/50 |
| 2017/0131174 | A1 | 5/2017 | Enev et al. | |
| 2018/0136076 | A1* | 5/2018 | Kusumura | G01M 3/28 |
| 2020/0124494 | A1* | 4/2020 | Solomon | G01M 3/2815 |

* cited by examiner

| Serial Number | Pressure | Flow | Time Interval | Anomaly score |
|---|---|---|---|---|
| 1 | 46.399803 | -169.429567 | 1-10-2019 ------00.00.00 | -1.0775501 |
| 2 | 46.419803 | 10.986396 | 1-10-2019-------01.00.00 | -1.122249 |
| 3 | 46.429546 | 11.043794 | 1-10-2019-------02.00.00 | -1.104234 |
| 4 | 46.459678 | 10.597639 | 1-10-2019-------03.00.00 | -1.013855 |
| 5 | 46.479879 | -1.240802 | 1-10-2019 ------04.00.00 | -0.969936 |
| 6 | 46.519546 | -1.931455 | 1-10-2019-------05.00.00 | -1.084686 |
| 7 | 46.539124 | -5.227894 | 1-10-2019-------06.00.00 | -0.981525 |
| 8 | 46.579678 | -3.474291 | 1-10-2019-------07.00.00 | -0.986443 |
| 9 | 46.599897 | 129.976345 | 1-10-2019-------08.00.00 | -0.989679 |
| 10 | 46.479456 | 243.467395 | 1-10-2019-------09.00.00 | -1.024507 |
| 11 | 46.579876 | 184.764984 | 1-10-2019-------10.00.00 | -1.005966 |
| 12 | 46.499234 | 1.098467 | 1-10-2019-------11.00.00 | -1.026826 |
| 13 | 46.499987 | 0.5647927 | 1-10-2019-------12.00.00 | -1.025383 |
| 14 | 46.789654 | -0.287493 | 1-10-2019-------13.00.00 | -1.001714 |
| 15 | 46.299678 | -0.287456 | 1-10-2019-------14.00.00 | -0.966112 |
| 16 | 46.399823 | 1.896456 | 1-10-2019-------15.00.00 | -0.974787 |
| 17 | 46.209435 | 4.392786 | 1-10-2019-------16.00.00 | -1.001724 |
| 18 | 46.309545 | -0.576890 | 1-10-2019-------17.00.00 | -1.025966 |
| 19 | 46.699678 | 123.768456 | 1-10-2019-------18.00.00 | -0.986843 |
| 20 | 46.779675 | 156.908765 | 1-10-2019-------19.00.00 | -0.923525 |
| 21 | 46.699654 | 0.356926 | 1-10-2019-------20.00.00 | -1.813855 |
| 22 | 46.409234 | -0.467899 | 1-10-2019-------21.00.00 | -1.976687 |
| 23 | 46.309817 | -0.675015 | 1-10-2019-------22.00.00 | -1.13449 |
| 24 | 46.369111 | 3.789567 | 1-10-2019-------23.00.00 | -1.013455 |
| 25 | 46.679234 | -3.098765 | 1-10-2019-------24.00.00 | -1.023955 |

Fig.2b

| Serial Number | Pressure | Flow | Time Interval | Anomaly score |
|---|---|---|---|---|
| 6 | 46.519546 | -1.931455 | 1-10-2019--------05.00.00 | -1.084686 |
| 24 | 46.369111 | 3.789567 | 1-10-2019--------23.00.00 | -1.013455 |

Fig.2c

METHOD AND SYSTEM FOR PREDICTING WATER LEAKAGE EVENTS IN DISTRICT-METERED-AREA OF WATER DISTRIBUTION NETWORK

TECHNICAL FIELD

The present subject matter is generally related to water distribution network and more particularly, but not exclusively, to a method and a system for predicting water leakage events in District Metered Areas (DMA) of water distribution network.

BACKGROUND

In the recent years there has been a growing focus on the Unaccounted-For Water (UFW) and water conservation because of shortage of resources and increasing cost of water management. In addition to acquiring new sources for water generation it has become critical to prevent water wastage in different stages of transmission, refinement and distribution. In the last few years there has been ongoing focus on research and building various advance analytics solutions to accurately understand the leakage problems in water distribution network and efficiently leverage technology to predict leakages. The results show that majority of the leaks deal with the parameters such as pressure, water flow anomalies, aging infrastructure and extreme weather conditions.

The existing methodologies for water leak detection uses leak detection techniques using acoustic sensors. These techniques have been proven to be very effective in water distribution pipes. However, these methods need long distance deployment and proper position of sensors and cannot be implemented on underground pipelines. Further, the existing systems may not consider real time data of hydraulics of the water network which is a key to manage leakages. Therefore, the existing systems do not accurately predict magnitude of water leakage with time stamped and geo-referenced location.

The information disclosed in this background of the disclosure section is only for enhancement of understanding of the general background of the invention and should not be taken as an acknowledgment or any form of suggestion that this information forms the prior art already known to a person skilled in the art.

SUMMARY

Disclosed herein is a method for predicting water leakage events in a District Metered Area (DMA) of a water distribution network. The method comprises receiving, by a prediction system, historic data of water flow and water pressure associated with the DMA. Based on the historic data the method predicts flow data and pressure data of water in the DMA for a predefined future time period. Thereafter, the method comprises retrieving plurality of cluster points corresponding to the predicted flow data, the pressure data, and an anomaly score identified for each of the plurality of cluster points from a machine learning model associated with the prediction system. The method further comprises detecting one or more cluster points as anomaly points by comparing the anomaly scores with a lower bound value and an upper bound value. Upon detecting the anomaly points, the method comprises predicting leakage events corresponding to each of the detected anomaly points.

Further, the present disclosure discloses a system for predicting water leakage events in a District Metered Area (DMA) of a water distribution network. The system comprises a processor and a memory communicatively coupled to the processor. The memory stores the processor-executable instructions, which, on execution, causes the processor to receive historic data of water flow and water pressure associated with the DMA. The processor predict flow data and pressure data of water in the DMA based on the historic data for a predefined future time period. Thereafter, the processor retrieves plurality of cluster points corresponding to the predicted flow data, the pressure data, and an anomaly score identified for each of the plurality of cluster points from a machine learning model associated with the prediction system, once the plurality of cluster points are retrieved, the processor detects one or more cluster points as anomaly points by comparing the anomaly scores with a lower bound value and an upper bound value. Finally, the processor predict water leakage events corresponding to each of the detected anomaly points.

Furthermore, the present disclosure comprises a non-transitory computer readable medium including instructions stored thereon that when processed by at least one processor causes a prediction system for predicting water leakage events in a District Metered Area (DMA) of a water distribution network to receive historic data of water flow and water pressure associated with the DMA. Further, the instructions cause the processor to predict flow data and pressure data of water in the DMA based on the historic data for a predefined future time period. Furthermore, the instructions cause the processor to retrieve plurality of cluster points corresponding to the predicted flow data, the pressure data, and an anomaly score identified for each of the plurality of cluster points from a machine learning model associated with the prediction system. In addition, the instructions cause the processor to detect one or more cluster points as anomaly points by comparing the anomaly scores with a lower bound value and an upper bound value. Finally, the instructions cause the processor to predict water leakage events corresponding to each of the detected anomaly points.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

FIGS. 2b-2c shows tables illustrating the predicted flow data and pressure data along with anomaly scores in accordance with some embodiments of the present disclosure;

Figure 1:
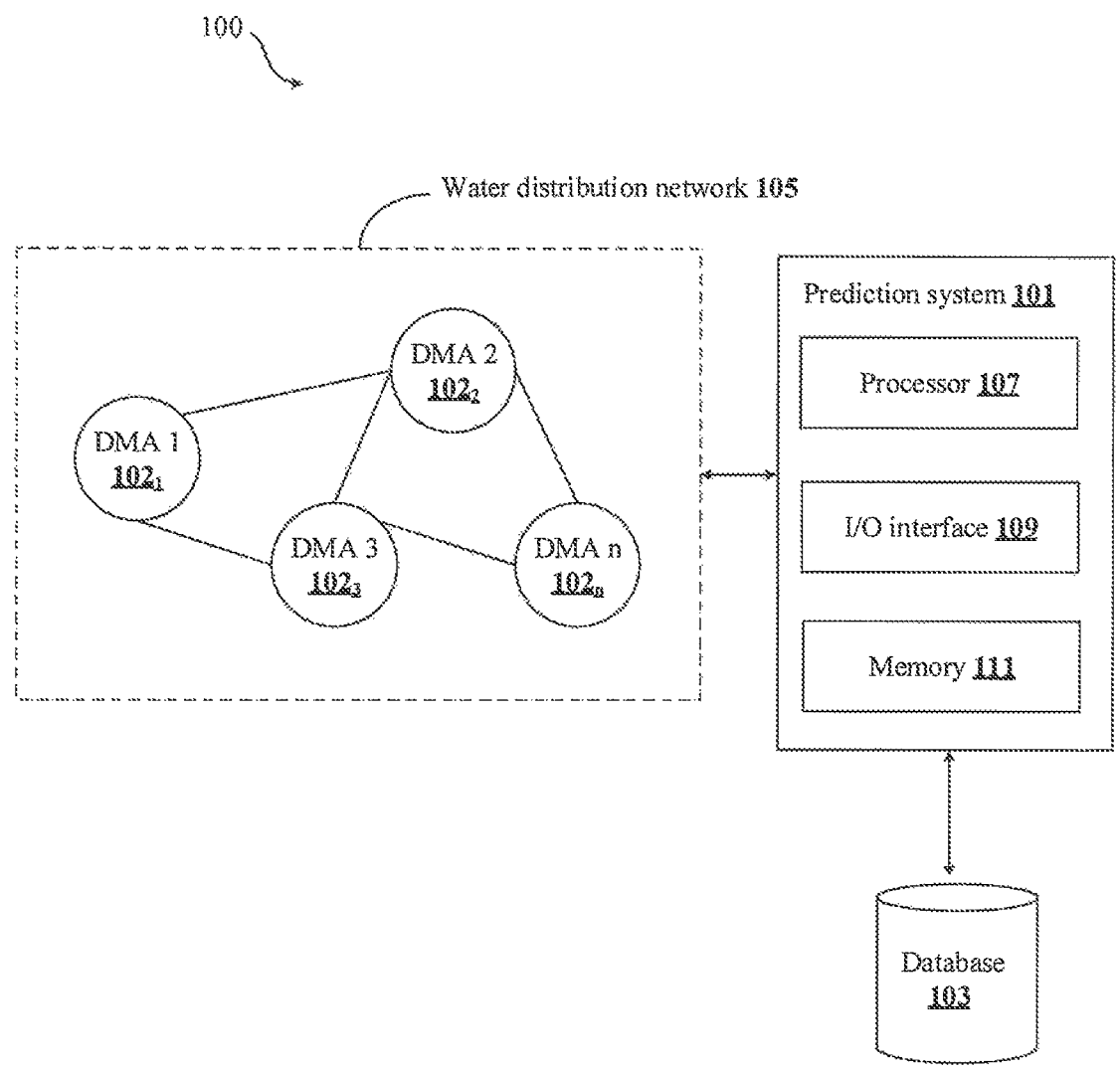
FIG. 1 shows an exemplary architecture for predicting water leakage events in a District Metered Area (DMA) of a water distribution network in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", "including" or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to method and system for predicting water leakage events in District Metering Areas (DMA) of a water distribution network. The water distribution network may comprise one or more DMAs wherein each DMA may be configured with flow sensor and pressure sensor to detect flow and pressure of water in the DMA. The system may receive historic data of water flow and water pressure associated with the DMA in order to predict flow data and pressure data of water in the DMA for a predefined future time period. The system may implement a machine learning model such as a Long Short Term Model (LSTM). The model may provide plurality of cluster points which corresponds to the predicted flow data and the pressure data or the flow points and pressure points. The model may also provide an anomaly score identified for each of the plurality of cluster points. The anomaly score may indicate probability of water leakage at the corresponding cluster points. The system may detect the one or more cluster points as anomaly points by comparing the anomaly scores with a lower bound value and an upper bound value. The lower bound value may be computed using an Inter Quantile Range (IQR) value, a first quantile value and a first threshold value. The upper bound value may be computed using the IQR value, a second quantile value and a second threshold value. The one or more cluster points may be detected as the anomaly points when the anomaly score is less than the lower bound value and greater than the upper bound value. If the calculated anomaly score is higher than a threshold value, the model may determine these points (which are time stamped and geo-referenced) as anomaly points which helps to predict probable water leakage events which are likely to occur in future time intervals. The system may predict the water leakage events corresponding to each of the detected anomaly points. The water leakage event may comprise information associated with water leakage predicted for a future date and time interval. In this manner, the present disclosure may predict water leakage events in a DMA for a future time intervals and hence necessary leakage maintenance actions may be taken to avoid such events.

FIG. 1 shows an exemplary architecture for predicting water leakage events in a District Metered Area (DMA) of a water distribution network in accordance with some embodiments of the present disclosure.

The architecture 100 may include a water distribution network 105, a prediction system 101 [alternatively referred as system] and a database 103. The water distribution network 105 may include one or more District Metering Areas (DMA) $102_1$ to $102_n$. Each DMA 102 may be associated with a flow sensor and a pressure sensor for detecting water flow and water pressure in the DMA 102 respectively. In an embodiment, the prediction system 101 may be a remotely located server. The prediction system 101 may be associated with the water distribution network 105 for predicting water leakage events in the DMAs 102. The prediction system 101 may provide an indication as to which of the DMAs 102 could be possibly experiencing water leakages, so that proactive maintenance actions could be taken to avoid such events. For the purpose of illustration, the method of predicting water leakage events for a single DMA 102 is disclosed further in the below sections. However, the method may also be applicable to predict the water leakage events in all the DMAs 102 of the water distribution network 105. The prediction system 101 may include a processor 107, a I/O Interface 109 and a memory 111. The I/O Interface 109 may be configured to receive data associated with water flow and pressure from the database 103 associated with the system 101.

In an embodiment, the processor 107 may be configured to receive historic data of water flow and water pressure from the database 103 through the I/O Interface 109. The historic data of water flow and water pressure of the DMA 102 may be stored in the database 103. As an example, the historic data may be the data of last 2 months. Upon receiving the historic data, the processor 107 may predict the flow data and pressure data of water in the DMA 102 based on the historic data for a predefined future time period. As an example, the predefined future time period may be next 15 days. So, the processor 107 may predict the flow data and the pressure data of the water in the DMA 102 for the next 15 days. Thereafter, the processor 107 may retrieve plurality of cluster points corresponding to the predicted flow data and the pressure data. The plurality of cluster points may be identified using a machine learning model such as Long Short Term Model (LSTM). The model may provide the cluster points in a cluster map corresponding to the predicted flow data and the pressure data of the water in the DMA 102.

In an embodiment, the model may also identify anomaly score corresponding to each of the plurality of cluster points. The plurality of cluster points and its corresponding anomaly score may not provide information on the anomaly or the water leakage events as the cluster map is only a cluster distribution of the predicted flow and pressure data. Hence, the processor 107 may detect the one or more cluster points as anomaly points by comparing the anomaly scores with a lower bound value and an upper bound value. The lower bound value may be computed using an Inter Quantile Range (IQR) value, a first quantile value and a first threshold value. The upper bound value may be computed using the IQR value, a second quantile value and a second threshold value. The one or more cluster points may be detected as the anomaly points when the anomaly score is less than the lower bound value and greater than the upper bound value. Upon detecting the one or more anomaly points, the system 101 may predict the water leakage events corresponding to each of the detected anomaly points. The water leakage events provide information of water leakages in the DMA 102 which are predicted for future time intervals.

Figure 2A:
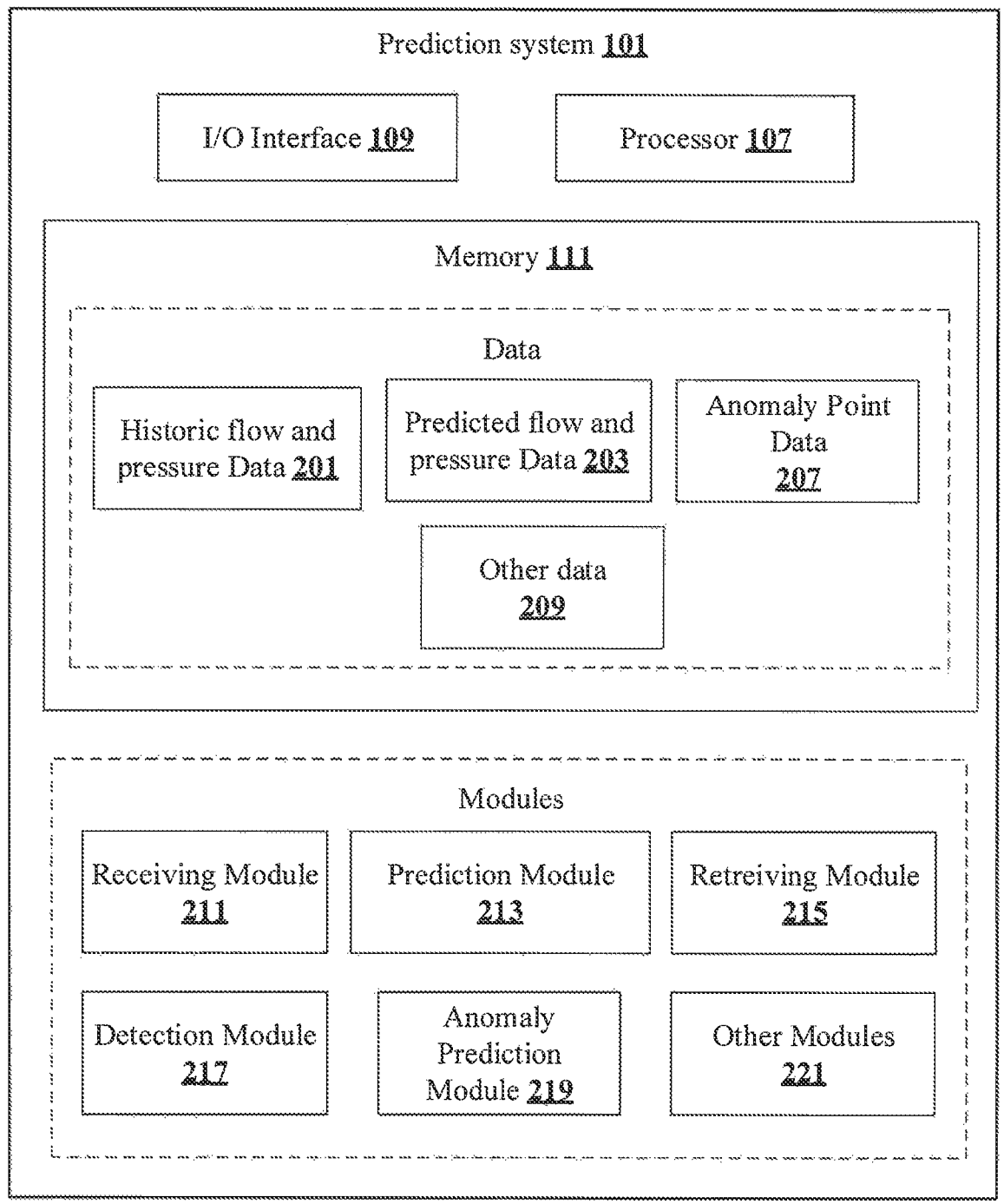
FIG. 2a shows a block diagram of a prediction system in accordance with some embodiments of the present disclosure.

FIG. 2a shows a block diagram of a prediction system in accordance with some embodiments of the present disclosure.

In some implementations, the system 101 may include data and modules. As an example, the data is stored in a memory 111 configured in the system 101 as shown in the FIG. 2a. In one embodiment, the data may include historic flow and pressure data 201, predicted flow and pressure data 203, anomaly point data 207 and other data 209. In the illustrated FIG. 2a, modules are described herein in detail.

In some embodiments, the data may be stored in the memory 111 in form of various data structures. Additionally, the data can be organized using data models, such as relational or hierarchical data models. The other data 209 may store data, including temporary data and temporary files, generated by the modules for performing the various functions of the system 101.

In some embodiments, the data stored in the memory 111 may be processed by the modules of the system 101. The modules may be stored within the memory 111. In an example, the modules communicatively coupled to the processor 107 configured in the system 101, may also be present outside the memory 111 as shown in FIG. 2a and implemented as hardware. As used herein, the term modules may refer to an Application Specific Integrated Circuit (ASIC), an electronic circuit, a processor (shared, dedicated, or group) and memory 111 that execute one or more software or firmware programs, a combinational logic circuit, and/or other suitable components that provide the described functionality.

In some embodiments, the modules may include, for example, a receiving module 211, a prediction module 213, a retrieving module 215, a detection module, anomaly prediction module and other modules 221. The other modules 221 may be used to perform various miscellaneous functionalities of the system 101. It will be appreciated that such aforementioned modules may be represented as a single module or a combination of different modules.

In an embodiment, the other modules 221 may be used to perform various miscellaneous functionalities of the system 101. It will be appreciated that such modules may be represented as a single module or a combination of different modules. Furthermore, a person of ordinary skill in the art will appreciate that in an implementation, the one or more modules may be stored in the memory 111, without limiting the scope of the disclosure. The said modules when configured with the functionality defined in the present disclosure will result in a novel hardware.

In an embodiment, the receiving module 211 may be configured to receive historic flow data and pressure data 201 from the database 103 associated with the system 101. The database 103 may store flow data and pressure data as flow and pressure points of water associated with each DMA 102.

In an embodiment, the prediction module 213 may be configured to predict the flow data and pressure data based on the received historic flow data and the pressure data which is stored as predicted flow and pressure data 203. The system 101 may be used to predict water leakages in predefined future time intervals. As an example, the system 101 may be used to predict the water leakages in DMA 1 $102_1$ on 1 Oct. 2019. For this purpose, the receiving module 211 may receive the historic flow data and the pressure data of the DMA 1. As an example, the historic flow data and the pressure data of the DMA 1 $102_1$ of last 6 months may be obtained from the database 103. In an embodiment, there may be a possibility of unavailability of the historic pressure or flow data at the specific time intervals. Therefore, the system 101 may determine the time intervals at which both flow and pressure data is available and only those data are provided to a model which implements supervised neural network technique for further processing. Based on the last 6 months historic data, the model predicts the flow data and the pressure data for a future date say 1 Oct. 2019. Based on the predicted flow data and the pressure data, the model may generate a cluster map comprising plurality of cluster points. The predicted flow and pressure data are provided to unsupervised machine learning model such as Local Outlier Factor Model. The model calculates reachability distance for every flow and pressure data point. The reachability distance may be used to compute anomaly score of every point (flow and pressure data point). Each point may be categorized as an anomaly or not by thresholding the anomaly score of that point. If the calculated anomaly score is higher than a threshold value, the model may determine these points (which are time stamped and geo-referenced) as anomaly points which helps to predict probable water leakage events which are likely to occur in future time intervals.

The retrieving module 215 may obtain the plurality of cluster points from the model corresponding to the predicted flow data and the pressure data. An exemplary value of the flow and pressure points along with the anomaly scores for the flow and pressure points is as shown in FIG. 2b.

In an embodiment, the detection module 217 may be configured to detect the one or more cluster points as the one or more anomaly points based on lower bound value and upper bound value.

In order to detect the anomaly points, the detection module 217 may first identify a first quantile value (Q1) and a second quantile value (Q3) based on the anomaly scores. The first quantile value Q1 may be 25% of the anomaly score corresponding to each of the plurality of cluster points. Therefore, Q1 may be 25% of total value obtained by adding the 25 anomaly scores shown in FIG. 2b. Similarly, Q3 may be 75% of total value obtained by adding the 25 anomaly scores shown in FIG. 2b. Further, the detection module may compute a Inter Quartile Range (IQR) value based on the first quantile value Q1 and the second quantile value Q3. The IQR may be used as a measure of how spread out the anomaly scores are in the cluster map. The IQR may be computed based on equation 1 below.

$$IQR = Q3 - Q1 \qquad (1)$$

In an embodiment, the detection module 217 may compute the lower bound value based on the IQR value, the first quantile value and a first threshold value as shown in equation 2 below.

$$\text{Lower bound value} = Q1 - 7.5 * IQR \qquad (2)$$

Wherein 7.5 is the first threshold value.

Similarly, the detection module 217 may compute the upper bound value based on the IQR, the second quantile value and a second threshold value as shown in equation 3 below.

$$\text{Upper bound value} = Q3 - 0.65 * IQR \qquad (3)$$

Wherein the 0.65 is the second threshold value.

The first threshold value and the second threshold value may be predefined and may vary for various DMAs 102 in the water distribution network 105.

The detection module 217 may detect the one or more cluster points as anomaly points when the anomaly score is less than the lower bound value and greater than the upper bound value. The detected anomaly points are stored as anomaly point data 207. The detection module compares each of the anomaly score shown in FIG. 2b with the lower bound value and the upper bound value and detects the one or more anomaly scores which match the criteria of less than the lower bound value and greater than the upper bound value. As an example, the detection module 217 may identify 2 anomaly scores shown in FIG. 2c which match the criteria and hence these anomaly score may be detected as the anomaly points. Based on these anomaly points the anomaly prediction module 219 may predict the water leakage events corresponding to the detected anomaly points. As an example, the anomaly prediction module 219 may predict that on 1 Oct. 2019 at 5 pm and 11 pm there may be a possibility of water leakage. Based on this prediction one or more maintenance actions could be taken to avoid the water leakage events.

In an embodiment, once the water leakage events are identified, the water leakage events may be displayed in an interactive dashboard associated with the system 101. The interactive dashboard may be used to display the water leakage events in each DMA. The interactive dashboard may be generated using big data analytics platform.

Figure 3:
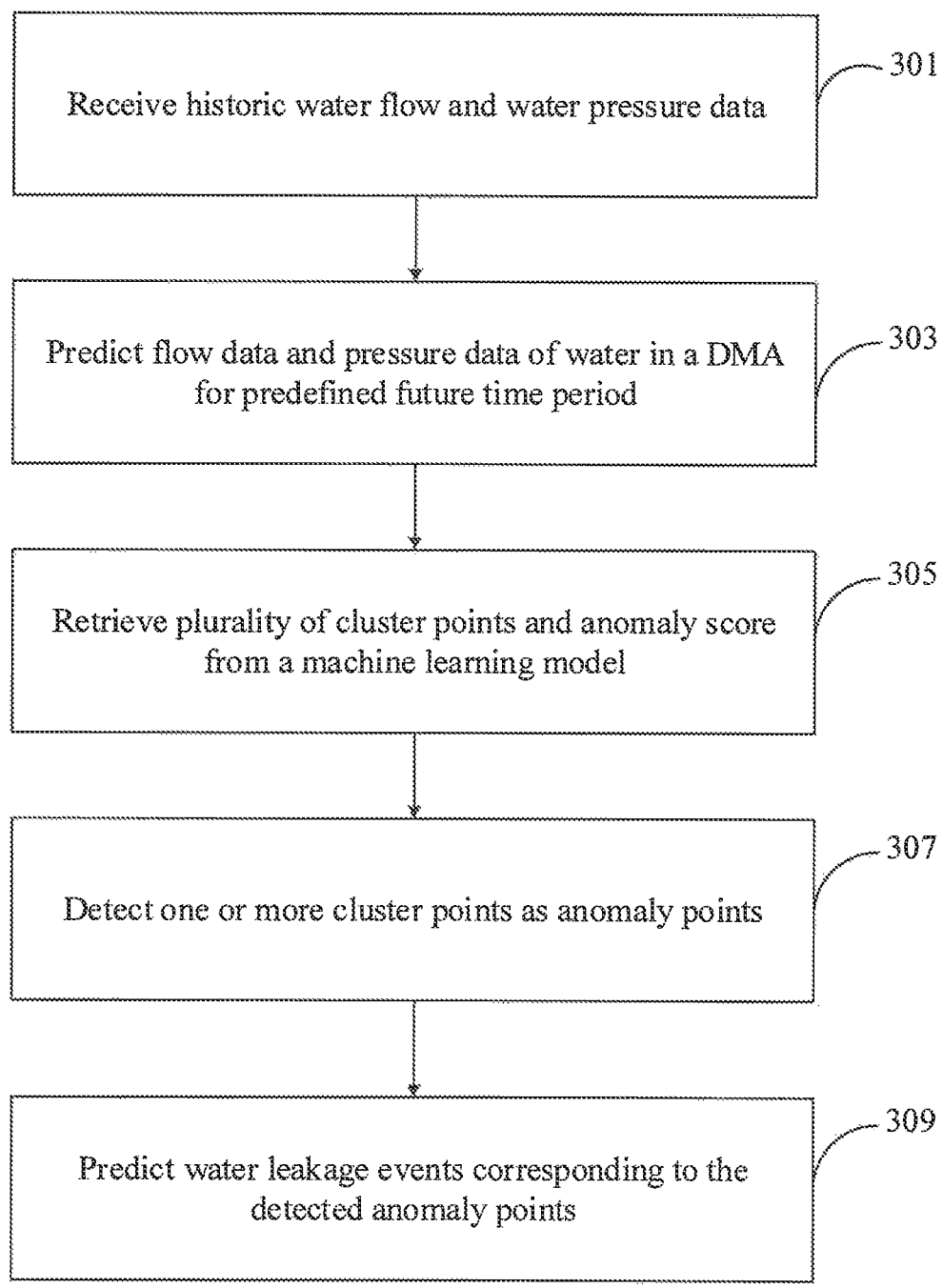
FIG. 3 shows a flowchart illustrating method of predicting water leakage events in DMA of a water distribution network in accordance with some embodiments of the present disclosure.

FIG. 3 shows a flowchart illustrating method of predicting water leakage events in DMA of a water distribution network 105 in accordance with some embodiments of the present disclosure.

As illustrated in FIG. 3, the method 300 includes one or more blocks illustrating a method of predicting water leakage events in DMA 102 of a water distribution network 105. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the method may include receiving, by a prediction system 101, historic data of water flow and water pressure associated with the DMA 102. The historic data of water flow and water pressure in the DMA 102 may be received by the prediction system 101 from a database 103 associated with the prediction system 101.

At block 303, the method may include predicting, by the prediction system 101, flow data and pressure data of water in the DMA 102 based on the historic data for a predefined future time period.

The prediction system 101 may predict the flow data and the pressure data of water in the DMA 102 based on the historic data for the predefined future time period. As an example, the predefined future time period may be for next 15 days. The predefined future time period may also be a fixed time interval such as 15 Sep. to 15 Oct. 2019.

At block 305, the method may include retrieving, by the prediction system 101, plurality of cluster points corresponding to the predicted flow data, the pressure data, and an anomaly score identified for each of the plurality of cluster points from a machine learning model associated with the system 101. In an embodiment, the prediction system 101 may be associated with the machine learning model. As an example, the machine learning model may be LSTM model. The model may be used to identify the plurality of cluster points corresponding to the predicted flow data and the pressure data. The model may also identify anomaly score for each of the plurality of cluster points.

At block 307, the method may include detecting, by the prediction system 101, one or more cluster points as anomaly points by comparing the anomaly scores with a lower bound value and an upper bound value. The prediction system 101 may identify a first quantile value (Q1) which is 25% of the anomaly score corresponding to each of the plurality of cluster points. The prediction system 101 may also identify a second quantile value (Q3) which is 75% of the anomaly score corresponding to each of the plurality of cluster points. Based on Q1 and Q3, the system 101 may compute Inter Quartile Range (IQR). Thereafter, the method comprises computing a lower bound value based on the IQR value, the first quantile value and a first threshold value and computing an upper bound value based on the IQR value, the second quantile value and a second threshold value. The first threshold value and the second threshold value may vary for each DMA 102 in the water distribution network 105. The one or more cluster points may be detected as anomaly points when the anomaly score is less than the lower bound value and greater the upper bound value.

At block 309, the method may include predicting, by the prediction system 101, water leakage events corresponding to each of the detected anomaly points. The prediction system 101 may predict the water leakage events such as water leakage predicted for a future date and time interval.

In an embodiment, the prediction of the water leakage events for a future date and time may aid in undertaking leakage maintenance actions to avoid such events.

Computer System

Figure 4:
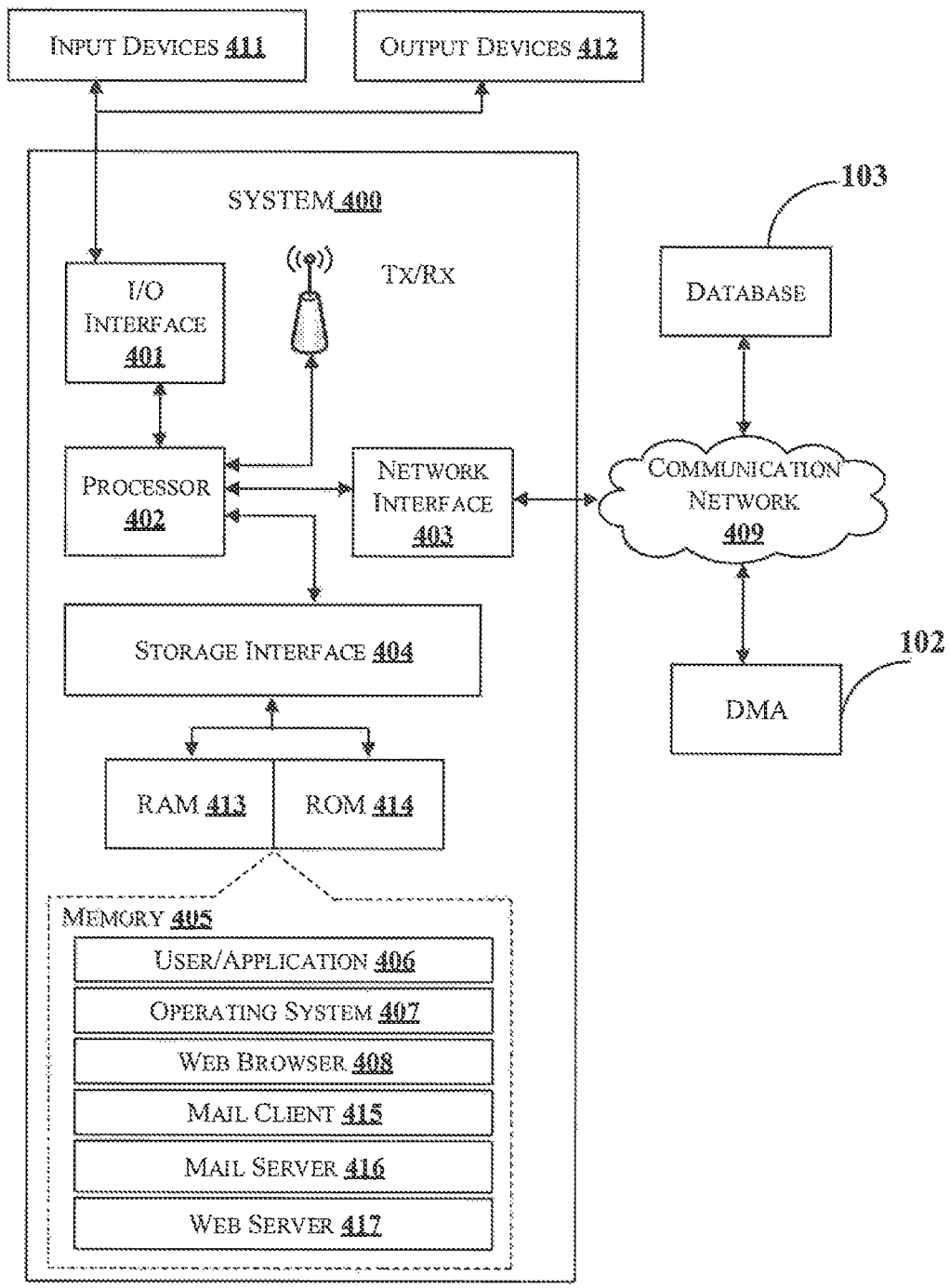
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be a prediction system 101, which is used for predicting water leakage events in a district metered area of a water distribution network 105. The computer system 400 may include a central processing unit ("CPU" or "processor") 402. The processor 402 may comprise at least one data processor for executing program components for executing user or system-generated business processes. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 511 and 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc.

The communication network 409 can be implemented as one of the several types of networks, such as intranet or Local Area Network (LAN) and such within the organization. The communication network 409 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application 406, an operating system 407, a web browser 408, mail client 415, mail server 416, web server 417 and the like. In some embodiments, computer system 400 may store user/application data 406, such as the data, variables, records, etc. as described in this invention. Such databases may be implemented as fault-tolerant, relational, scalable, secure databases such as Oracle® or Sybase®.

The operating system 407 may facilitate resource management and operation of the computer system 400. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like. A user interface may facilitate display, execution, interaction, manipulation, or operation of program components through textual or graphical facilities. For example, user interfaces may provide computer interaction interface elements on a display system operatively connected to the computer system 500, such as cursors, icons, check boxes, menus, windows, widgets, etc. Graphical User Interfaces (GUIs) may be employed, including, without limitation, APPLE MACINTOSH® operating systems, IBM™ OS/2, MICROSOFT™ WINDOWS™ (XP™, VISTA™/7/8, 10 etc.), Unix® X-Windows, web interface libraries (e.g., AJAX™, DHTML™, ADOBE® FLASH™, JAVASCRIPT™, JAVA™, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure Are Illustrated Herein.

In an embodiment, the present disclosure provides a method and system for predicting water leakage events in a District Metered Area (DMA) of a water distribution network.

In an embodiment, the present disclosure uses a machine learning model to predict anomaly scores which indicates anomalies of water leakage events.

In an embodiment, the present disclosure predicts the water leakage events in future time intervals and hence enables proactive leak repair and maintenance actions to control water loss and prevent occurrences of potential bursts.

Thus, the disclosed method and system tries to overcome the technical problem of predicting water leakage events well in advance in each DMA in water distribution network.

Specifically, the claimed limitation of identifying anomaly points in each DMA ensures that the above mentioned technical problem is address by predicting water leakage events well in advance.

Also, the claimed limitations bring an improvement in accurately predicting water leakage events in the DMA so that necessary measures can be taken to avoid such events in future time intervals. Also, the claimed limitation brings an improvement in the functioning of the prediction system used for water distribution networks.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Architecture |
| 101 | Prediction system |
| 102 | District Metered Areas (DMA) |
| 103 | Database |
| 105 | Water distribution network |
| 107 | Processor |
| 109 | I/O Interface |
| 111 | Memory |
| 201 | Historic flow and pressure data |
| 203 | Predicted flow and pressure data |
| 207 | Anomaly point data |
| 209 | Other data |
| 211 | Receiving module |

-continued

| Reference Number | Description |
| --- | --- |
| 213 | Prediction module |
| 215 | Retrieving module |
| 217 | Detection module |
| 219 | Anomaly prediction module |
| 221 | Other modules |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User/Application |
| 407 | Operating system |
| 408 | Web browser |
| 409 | Communication network |
| 411 | Input devices |
| 412 | Output devices |
| 413 | RAM |
| 414 | ROM |
| 415 | Mail Client |
| 416 | Mail Server |
| 417 | Web Server |

What is claimed is:

1. A method for predicting water leakage events in a District Metered Area (DMA) of a water distribution network, the method comprising:

receiving, by a prediction system, historic data of water flow and water pressure associated with the DMA;

predicting, by the prediction system, flow data and pressure data of water in the DMA based on the historic data for a predefined future time period;

retrieving, by the prediction system, a plurality of cluster points corresponding to the predicted flow data, the pressure data, and an anomaly score identified for each of the plurality of cluster points from a machine learning model associated with the prediction system;

detecting, by the prediction system, one or more cluster points as anomaly points by comparing the anomaly scores with a lower bound value and an upper bound value, wherein detecting the one or more cluster points as anomaly points comprises:

identifying a first quantile value (Q1) and a second quantile value (Q3) based on the anomaly scores;

computing a Inter Quartile Range (IQR) value based on the first quantile value and the second quantile value;

computing the lower bound value based on the IQR value, the first quantile value and a first threshold value;

computing the upper bound value based on the IQR value, the second quantile value and a second threshold value; and detecting, the one or more cluster points as anomaly points when the anomaly score is less than the lower bound value and greater than the upper bound value; and predicting, by the prediction system, water leakage events corresponding to each of the detected anomaly points.

2. The method as claimed in claim 1, wherein the predicted flow data and the pressure data is associated with future time interval and date information.

3. The method as claimed in claim 1, wherein the first threshold value and the second threshold value vary for each DMA in the water distribution network, wherein:

the first quantile value is 25% of the anomaly score corresponding to each of the plurality of cluster points; and the second quantile value is 75% of the anomaly score corresponding to each of the plurality of cluster points.

4. The method as claimed in claim 1, wherein the water leakage event comprises information associated with water leakage predicted for a future date and time interval.

5. A prediction system for predicting water leakage events in a District Metered Area (DMA) of a water distribution network, the prediction system comprising:
a processor; and
a memory communicatively coupled to the processor, wherein the memory stores the processor-executable instructions, which, on execution, cause the processor to:
receive historic data of water flow and water pressure associated with the DMA;
predict flow data and pressure data of water in the DMA based on the historic data for a predefined future time period;
retrieve a plurality of cluster points corresponding to the predicted flow data, the pressure data, and an anomaly score identified for each of the plurality of cluster points from a machine learning model associated with the prediction system;
detect one or more cluster points as anomaly points by comparing the anomaly scores with a lower bound value and an upper bound value, wherein detecting the one or more cluster points as anomaly points comprises:
identifying a first quantile value (Q1) and a second quantile value (Q3) based on the anomaly scores;
computing a Inter Quartile Range (IQR) value based on the first quantile value and the second quantile value;
computing the lower bound value based on the IQR value, the first quantile value and a first threshold value;
computing the upper bound value based on the IQR value, the second quantile value and a second threshold value; and
detecting, the one or more cluster points as anomaly points when the anomaly score is less than the lower bound value and greater than the upper bound value; and
predict water leakage events corresponding to each of the detected anomaly points.

6. The prediction system as claimed in claim 5, wherein the predicted flow data and the pressure data is associated with future time interval and date information.

7. The prediction system as claimed in claim 5, wherein the first threshold value and the second threshold value vary for each DMA in the water distribution network wherein:
the first quantile value is 25% of the anomaly score corresponding to each of the plurality of cluster points; and
the second quantile value is 75% of the anomaly score corresponding to each of the plurality of cluster points.

8. The prediction system as claimed in claim 5, wherein the water leakage event comprises information associated with water leakage predicted for a future date and time interval.

9. A non-transitory computer readable medium including instructions stored thereon that when processed by at least one processor cause a prediction system to predict water leakage events in a District Metered Area (DMA) of a water distribution network by performing operations comprising:
receiving historic data of water flow and water pressure associated with the DMA;
predicting flow data and pressure data of water in the DMA based on the historic data for a predefined future time period;
retrieving a plurality of cluster points corresponding to the predicted flow data, the pressure data, and an anomaly score identified for each of the plurality of cluster points from a machine learning model associated with the prediction system;
detecting one or more cluster points as anomaly points by comparing the anomaly scores with a lower bound value and an upper bound value, wherein detecting the one or more cluster points as anomaly points comprises:
identifying a first quantile value (Q1) and a second quantile value (Q3) based on the anomaly scores;
computing a Inter Quartile Range (IQR) value based on the first quantile value and the second quantile value;
computing the lower bound value based on the IQR value, the first quantile value and a first threshold value;
computing the upper bound value based on the IQR value, the second quantile value and a second threshold value; and
detecting, the one or more cluster points as anomaly points when the anomaly score is less than the lower bound value and greater than the upper bound value; and
predicting water leakage events corresponding to each of the detected anomaly points.

* * * * *